United States Patent [19]
Reed

[11] Patent Number: 4,744,195
[45] Date of Patent: May 17, 1988

[54] APPARATUS FOR DISCRIMINATELY TREATING CONTAINERS AND THE LIKE

[76] Inventor: Gerald W. Reed, 39806 Kings River Dr., Kingsburg, Calif. 93631

[21] Appl. No.: 934,918

[22] Filed: Nov. 25, 1986

[51] Int. Cl.⁴ .......................... B65B 57/14; B65B 1/22
[52] U.S. Cl. .......................................... 53/52; 53/525; 198/366; 198/615; 209/925
[58] Field of Search ................... 53/52, 525; 198/366, 198/615; 209/698, 925

[56] References Cited

U.S. PATENT DOCUMENTS

| | | | |
|---|---|---|---|
| 847,230 | 3/1907 | Brockt | 209/650 |
| 2,853,188 | 9/1958 | Milliken | 209/698 X |
| 3,279,583 | 10/1966 | Abegglen | 198/366 |
| 3,344,579 | 10/1967 | Gentry | 53/525 |
| 3,520,406 | 7/1970 | Turner | 209/925 X |
| 3,566,579 | 3/1971 | Russell | 53/525 X |
| 3,821,875 | 7/1974 | Paxton | 53/374 |

Primary Examiner—John Sipos
Attorney, Agent, or Firm—Worrel & Worrel

[57] ABSTRACT

Apparatus for discriminately treating containers and the like, the apparatus includes a continuous conveyor mounting arms to carry a random stream of containers along first and second paths of travel; two photoelectric sensors positioned to sense and discriminate among the random stream of containers, and a control mechanism is mounted adjacent to the continuous conveyor to divert selected containers into the first or second path of travel, containers diverted into the second path of travel being urged into oscillating engagement with a vibrating bed for the purpose of settling the contents of the container.

9 Claims, 4 Drawing Sheets

APPARATUS FOR DISCRIMINATELY TREATING CONTAINERS AND THE LIKE

BACKGROUND OF THE INVENTION

1. Field of the Invention.

The present invention relates to an apparatus for discriminately treating containers and the like, and more particularly to an apparatus operable to discriminate selectively between containers having different contents and to divert selected containers into a predetermined path of travel for individual treatment such as engagement with a vibratory bed which imparts vibratory or oscillatory motion to the contents of such containers. The apparatus herein described has particular utility in the handling and treatment of volume filled and tray packed containers, which are used in the shipment of produce, delivered in intermixed, random order along a path of travel by discriminating between the two types of containers and applying vibratory motion only to the volume filled containers.

2. Description of the Prior Art.

In the produce packing industry, such as in the packing of fresh fruit, assorted machinery has been designed, developed and manufactured with the idea in mind of eliminating as much manual labor as possible. Produce packing is a highly labor intensive operation and therefore the direct costs of labor and equipment that are required effectively to separate, grade, and properly pack assorted product are substantial. A variety of apparatuses have been developed and employed over the years for this purpose. More particularly, the prior art is replete with a multiplicity of container handling devices which are adapted to manipulate a container in selected fashions for the purpose of treating the container's contents in a predetermined manner and for closing and sealing the container once packed.

The packing of produce can be subdivided into many categories. However, most produce is shipped and packaged in one of two fashions, that is, in a tray packed or a volume filled container. In some instances, depending upon the grade of the crop being processed, or upon the ultimate end use of the crop, a packing house or other processing plant may utilize both the tray packed and the volume filled containers for the same crop that is being processed at a given time. This is typical for fruit. Volume filled containers are those which are filled by simply allowing the fruit to tumble into the container. Tray packed containers are those in which the fruit is packed in layers within the container on trays having individual depressions to receive the fruit and where the fruit is oriented for display such as with the tips up. Volume filled containers stand in need of an additional processing step. More particularly, proper packing of volume filled containers requires the application of some form of vibratory or oscillatory motion to the containers once filled for the purpose of causing the contents of these volume filled containers to settle. This is required inasmuch as the initial packing of a volume filled container frequently results in the creation of air spaces within the contents thereof and thus a false volume is indicated. Typically, accordingly, the containers are overfilled to some degree to accommodate subsequent settling prior to sealing of the containers. No such requirement for vibrating or shaking the containers exists for tray packed containers. Further, it is undesirable to vibrate or shake tray packed containers because it may cause shifting of the fruit from the desired display attitudes and the application of such energy to tray packed containers may cause damage to the contents. In contrast, because volume filled fruit is not otherwise protected, such shaking is necessary to achieve settling so that in the sealed container there is no room for shifting during shipment which may damage the fruit.

The administration of vibratory motion through the utilization of variously configured mechanical mechanisms for the purpose of causing the settling of the contents of a volume filled container has been known for a long period of time. While these assorted devices are currently available and in wide-spread usage, they have suffered numerous shortcomings which have detracted from their usefulness. A lack of ability to discriminate between volume filled and tray packed containers has been their primary impediment. This problem is compounded in vibratory mechanisms which are currently in use in most packing house operations inasmuch as manual labor must be employed to segregate the volume and tray packed containers into different lots for appropriate treatment. Therefore, current devices do not balance the practical needs of the modern packing house operation and the interrelated parameters of efficiency and cost which is particularly critical to the profitability of such operations.

Still another problem encountered in prior art vibratory mechanisms which have been designed for such use is the propensity for the mechanisms to exhibit a characteristic inability to cooperate with other devices borne by the machine mounting the vibratory mechanism in the same or adjoining work stations.

Therefore, it has long been known that it would be desirable to have an apparatus for discriminately treating containers and the like which could be employed in a wide variety of different environments and on a variety of different machines, which could be manufactured and purchased at relatively moderate cost, which is both highly efficient in operation and capable of discriminating between volume filled and tray packed containers for the purpose of selectively treating the former with vibratory motion, and which reduces to an absolute minimum the assorted problems associated with the treatment of volume filled and tray packed containers.

SUMMARY OF THE INVENTION

Therefore, it is an object of the present invention to provide an improved apparatus for discriminately treating containers and the like.

Another object is to provide such an apparatus which has particular utility in operation in conjunction with the treatment and handling of volume filled and tray packed containers.

Another object is to provide such an apparatus which is operable to obtain the individual benefits to be derived from the prior art container treatment apparatuses while avoiding the detriments individually associated therewith.

Another object is to provide such an apparatus which is operable to reduce to a minimum the overall cost of processing a predetermined volume of selected produce.

Another object is to provide such an apparatus which is particularly well suited to discriminating between containers having selected contents and to thereafter divert the containers selected into a predetermined path of travel.

Another object is to provide such an apparatus which is operable to treat an intermixed, random stream of volume filled and tray packed containers rapidly, dependably, and efficiently, while reducing to an absolute minimum the possibility of malfunction.

Another object is to provide such an apparatus which is of relatively moderate cost to purchase and maintain and which is relatively inexpensive to operate per volume of produce treated during the packing process.

Another object is to provide such an apparatus which can be adapted to incorporate conventional produce packing technology for the purpose of further increasing the speed with which a given volume of produce can be treated during the packing process.

Another object is to provide such an apparatus which is characterized by ease of employment, simplicity of construction, and which can be sold at a relatively moderate price.

Further objects and advantages are to provide improved elements and arrangements thereof in an apparatus for the purpose described which is dependable, economical, durable and fully effective in accomplishing its intended purposes.

These and other objects are achieved in an apparatus for discriminately treating containers and the like of the present invention adapted to be mounted on a container handling machine having a housing mounting a conveyor which is operable selectively to carry containers along a path of travel and across a vibrating bed to impart oscillatory motion to the containers, the apparatus having arms operable to transport containers along another path of travel above the vibrating bed, a signal generating discriminator operable to discriminate between volume filled and tray packed containers and a control mechanism operable selectively to direct selected containers individually along the first and second paths of travel upon the signal transmitted from the discriminator.

DESCRIPTION OF THE PREFERRED EMBODIMENT

Figure 1:
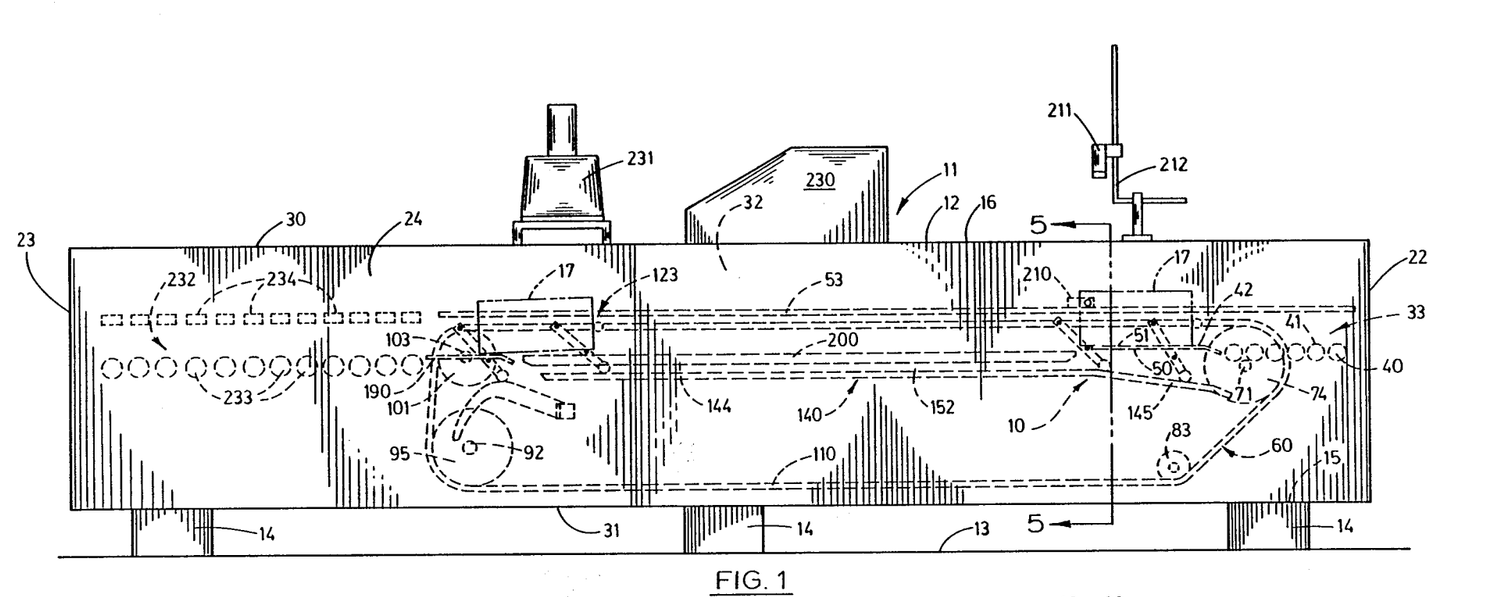
FIG. 1 is a side elevation of the apparatus for discriminately treating containers and the like of the present invention mounted on and functional as an operable part of a conventional container closing and sealing machine, the apparatus of the present invention shown in hidden lines therein.

Referring more particularly to the drawings, the apparatus for discriminately treating containers and the like of the present invention is generally indicated by the numeral 10 in FIG. 1. For illustrative convenience, the apparatus shown and described herein is discussed as it would be configured if it were installed as an operable subassembly of a conventional container handling machine in a packing house. Such a container handling machine is generally indicated by the numeral 11 in FIG. 1. The container handling machine is operable to receive containers traveling in single file, to tuck upstanding flaps thereof, to apply adhesive to certain portions of certain flaps of such containers, to fold the flaps into sealing relation to the containers and to retain the flaps bearing the adhesive in the sealed positions to allow the adhesive to set. It should be understood, however, that the apparatus of the present invention can be manufactured either as part of a complete new container handling machine, or installed on existing conventional container handling machines in the manner of a retrofit. Similarly, the apparatus can be employed in a wide variety of different embodiments for use in a variety of different environments.

Figure 3:
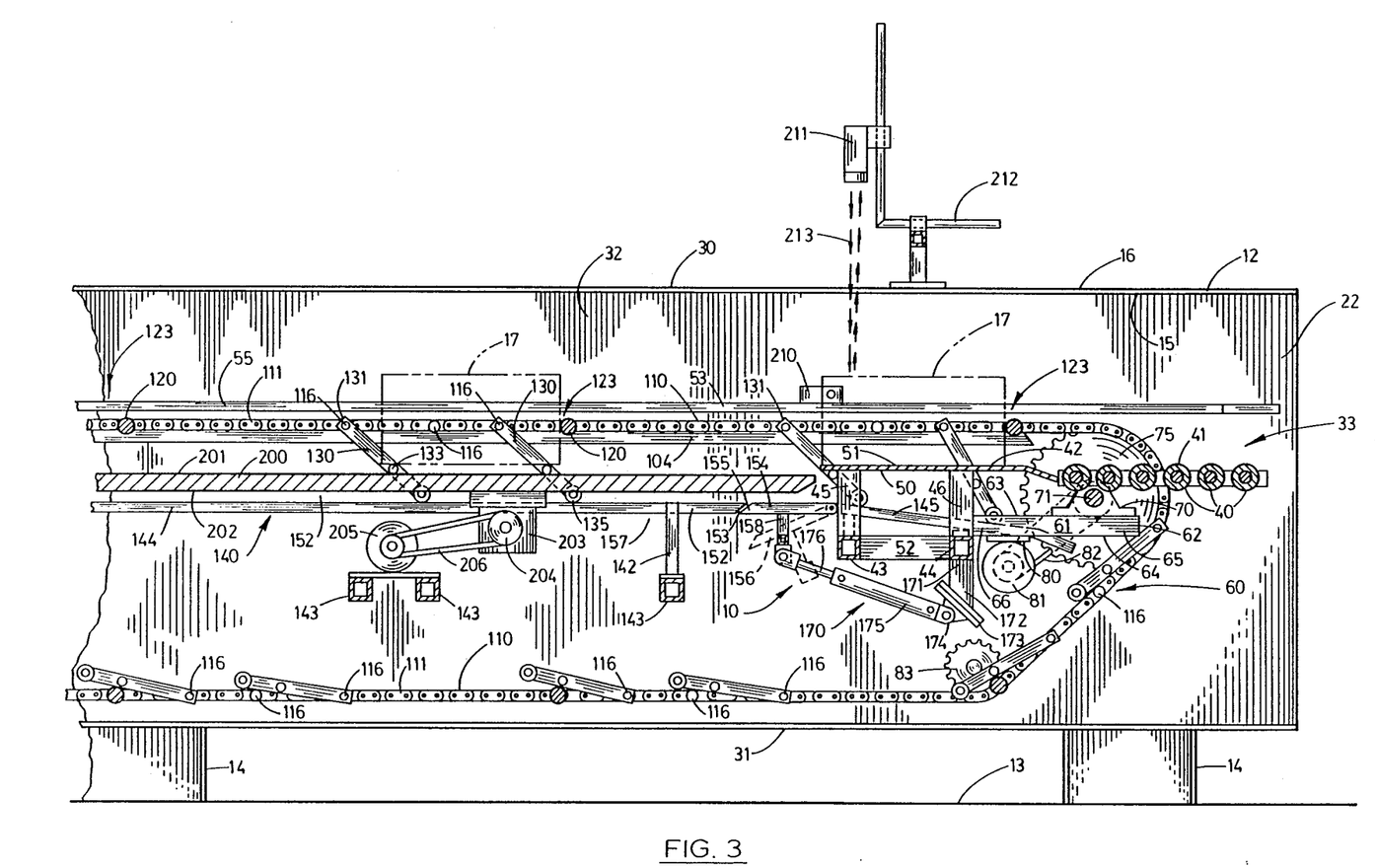
FIG. 3 is a somewhat enlarged, fragmentary, longitudinal, vertical section taken along line 3—3 of FIG. 2 and showing the first position of the hingedly mounted door in full lines and the second position thereof in phantom lines.

As best seen by reference to FIGS. 1 and 3, the apparatus 10 is mounted internally of a housing 12 of the container handling machine 11. The housing of the machine 11 is supported on the surface of a floor 13 by a plurality of legs 14. The housing has an internal surface and an external surface, generally indicated by the numerals 15 and 16, respectively. As shown in phantom lines in the drawings, containers passed through the housing 12 and discriminately treated by the apparatus 10 are indicated at numeral 17. It will be understood that the containers may be of either the volume filled or the tray packed type, as will hereinafter be described in greater detail.

The housing 12 has longitudinal and transverse axes 20 and 21, an intake end 22, and a discharge end 23. Mounted on the plurality of legs 14 is a left vertical side wall 24 and a right vertical side wall 25; each of the side walls 24 and 25 being formed out of an appropriate gauge sheet metal or the like. Mounted on and extending from the left and right side walls 24 and 25 in an attitude substantially normal to the internal surface 15 are top and bottom walls 30 and 31, respectively. The walls constitute integral portions of the housing.

Figure 2:
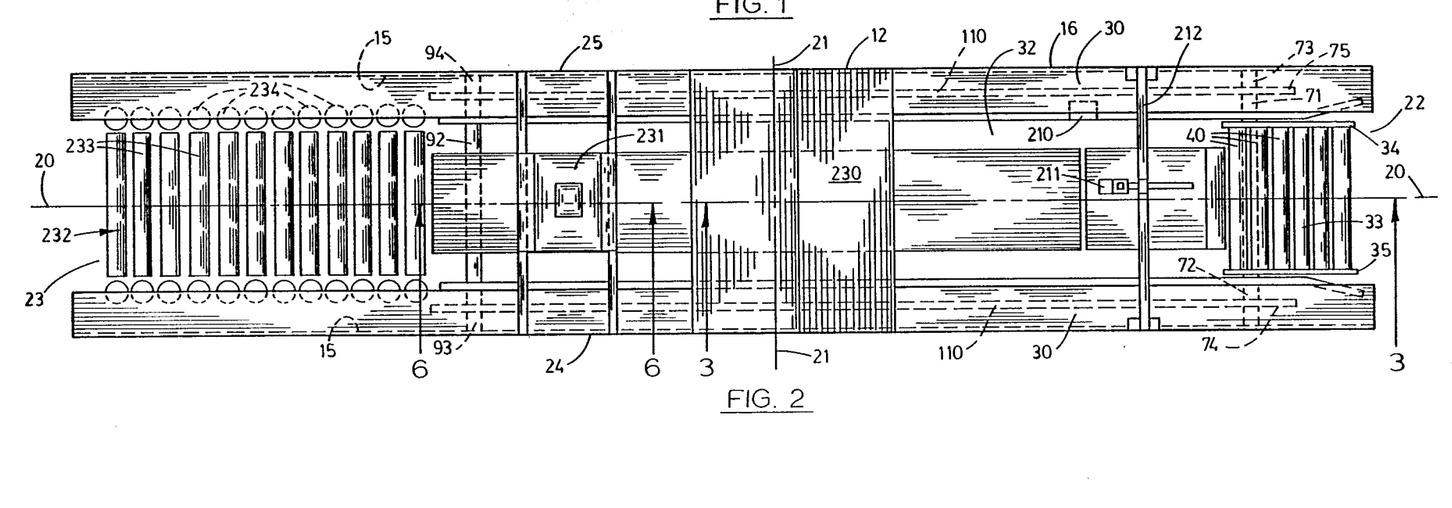
FIG. 2 is a top plan view of the apparatus of FIG. 1.
Figure 5:
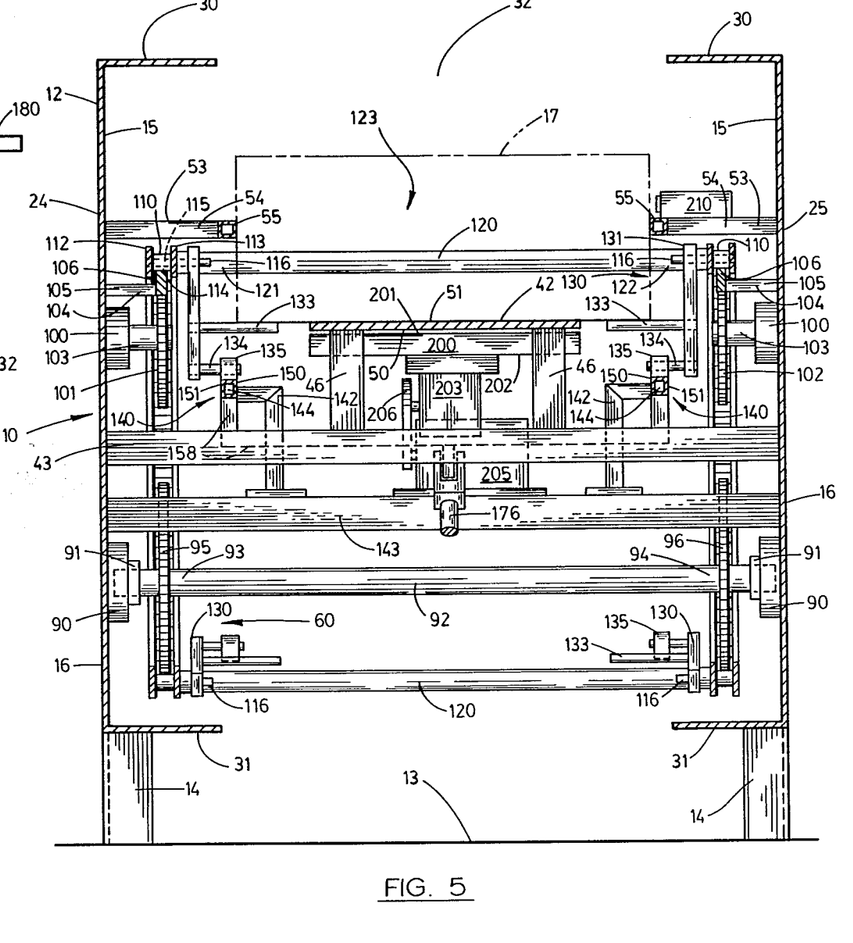
FIG. 5 is a somewhat enlarged, fragmentary, transverse, vertical section taken on line 5—5 in FIG. 1 with some internal structures removed for illustrative convenience.

As shown in FIGS. 2 and 5, the top wall 30, bottom wall 31, left side wall 24, and the right side wall 25 define a channel 32 wherein the apparatus 10 is operably mounted. Secured in a fixed, substantially horizontal relationship with the intake end 22 of the housing 12 is a powered intake bed 33 which is adapted to propel successive containers 17 into slidable receiving engagement internally of the channel 32. The intake bed 33 is of conventional design and therefore for the sake of brevity is not discussed in significant detail herein. However, it should be understood that the intake bed has first and second longitudinally disposed support members 34 and 35 which are mounted in fixed spaced relation one with the other. Rotatably mounted on and extending between the support members 34 and 35 are a plurality of powered rollers 40 which define a supporting surface 41. The powered rollers rotate in counterclockwise directions as viewed in FIG. 3, to propel the containers into the channel 32.

The powered intake bed 33 transports the containers 17 to be treated into slidable rested engagement with an intake station, constituting a portion of the apparatus 10 of the present invention, which is generally indicated by the numeral 42. The intake station is defined internally of the housing 12 by first and second transversely disposed beams 43 and 44 which are affixed by welding or the like to the left and right side walls 24 and 25, respectively. This relationship is best seen by reference to FIG. 3. Mounted on, and extending upwardly from, the first and second transversely disposed beams are a first and second pair of vertically disposed supports 45 and 46, respectively. The vertically disposed supports mount an intake platform 50 which has a supporting surface 51. The intake platform holds a container received thereon in a fixed predetermined attitude internally of the channel 32. A reinforcement beam 52 is affixed by welding or the like on and extends between the first and second transversely disposed beams to provide added strength. To direct a container 17 into an appropriate attitude internally of the channel 32, the housing mounts a pair of container guides 53. A plurality of transversely disposed support members 54 are mounted by welding on the internal surface 15 of the left and right side walls 24 and 25. The support member 54 mounts a longitudinally disposed guide rail 55 which extends the entire length of the channel from the intake end 22 to the discharge end 23. The pair of container guides operate to maintain the container in a position substantially centrally of the channel 32.

The container handling machine 11 has a continuous chain conveyor 60 mounted in a predetermined attitude internally of the housing 12 thereof. As best seen by reference to FIG. 3, the continuous chain conveyor has a bearing frame 61, consisting of a pair of beams 62 only one of which is shown, are affixed by welding and the like to the second transversely disposed beam 44, in close proximity to the intake end 22. The bearing frame has a top surface 63, a bottom surface 64, a first end 65 and a second end 66. Mounted to the top surface 63 at the first end 65 of each beam 62 is a bearing housing 70 which suitably mounts an individual bearing of appropriate dimension, not shown. The bearing housing slidably receives and mounts for axial rotational movement an axle 71. The axle 71 is of conventional design having first and second ends 72 and 73, which mount first and second sprockets 74 and 75, respectively. Affixed by welding or the like to the bottom surface 64 of the bearing frame 61, in close proximity to the second end 66 of the pair of beams 62 is a motor mount 80. The motor mount has an electric motor 81 mounted thereon in a predetermined attitude with respect to the axle 71. The electric motor is of conventional design having a drive pulley, not shown, which mounts a suitably dimensioned drive belt 82 which couples in power transmitting relation the electric motor with the axle 71. As should be understood, the axle 71 mounts a suitably dimensioned pulley, not shown, which rotatably mounts the drive belt 82. Mounted for rotational movement on the left and right side walls 24 and 25 in close proximity to the bottom wall 31 of the housing 12 is a pair of idler sprockets 83, only one of which is shown in FIGS. 1 and 3. The idler sprockets are mounted by a suitable bearing, not shown, on the internal surface 15 of the housing.

Affixed by welding or the like to the internal surface 15 of the housing 12 in an attitude somewhat closely adjacent to the discharge end 23, is a pair of bearing housings 90 which individually mount a suitably dimensioned bearing 91. Each bearing 91 is adapted to receive for axially rotational movement an axle 92. The axle has first and second ends 93 and 94 which mount first and second sprockets 95 and 96, respectively. Mounted on the inside surface of the housing in an attitude which is substantially midway between the top wall 30 and the bottom wall 31 of the housing is a pair of bearing housings 100. The individual bearing housings affix for rotational movement first and second idler sprockets 101 and 102, respectively. The idler sprockets 101 and 102 are positioned in a predetermined attitude internally of the housing by a suitably dimensioned axle 103. Mounted in an attitude substantially parallel to the longitudinal axis 20 of the housing and in predetermined fixed spaced relation along the channel 32, is a pair of chain guides which are generally indicated by the numeral 104. Each chain guide is of conventional design having a plurality of horizontally disposed support members which are affixed by welding and the like along the inside surface of the side walls 24 and 25, respectively, and a chain rail 106 is affixed to the support members. The pair of chain guides are best seen by reference to FIG. 5. The chain guides operate in a manner familiar to those skilled in the art, that being to support a continuous chain which will hereinafter be discussed in greater detail, to prevent it from drooping.

As best illustrated by reference to FIGS. 3 and 5, the continuous chain conveyor 60 mounts for rotational movement about the axles 71 and 92 and the pair of idler sprockets 83, and the first and second idler sprockets 101 and 102, a pair of continuous chains generally indicated by the numeral 110. The continuous chains each have a plurality of pivotally affixed links 111 which are of conventional design consisting of first and second elongated members 112 and 113, which are held in fixed spaced relationship, one with the other, by a spacer 114. The elongated members 112 and 113 are held together by a pin or fastener 115 which is received through an orifice, not shown, which is formed in each elongated member and in the spacer.

Figure 4:
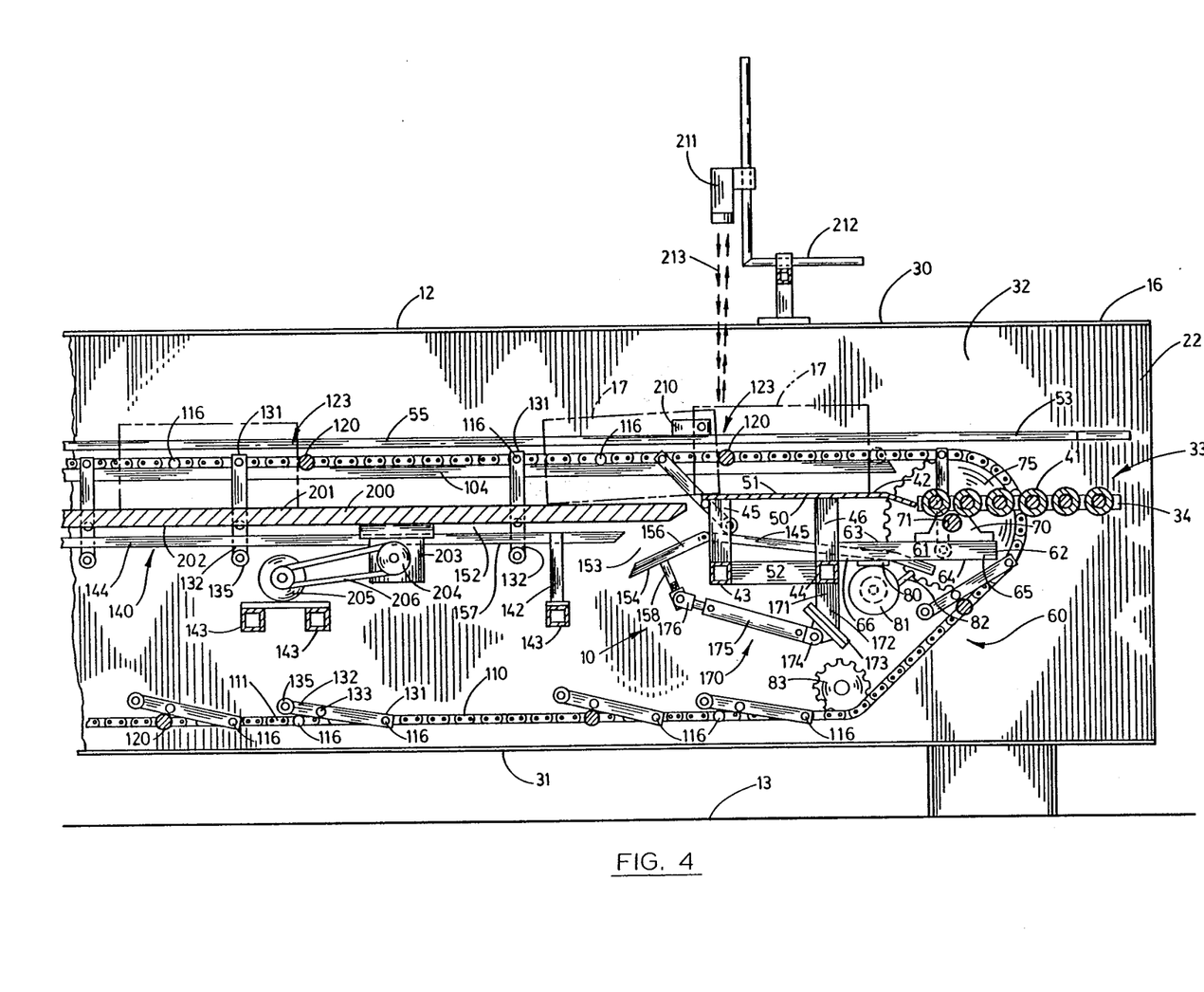
FIG. 4 is a somewhat enlarged, fragmentary, longitudinal, vertical section taken from the same position as FIG. 3 and showing a container in phantom lines moving into contact with the vibrating bed as a result of the door being in the second position.

The apparatus 10 has predetermined fasteners 115 which have extensions 116 extending inwardly of the machine 11, as can best be seen in FIG. 5. Those fasteners 115 having the extensions 116 are disposed in spaced relation to each other on each continuous chain, as can best be visualized in FIGS. 3 and 4. The spacing is such that three of such extensions 116 are deployed on each continuous chain for each container 17 to be passed through the machine 11. Similarly, there are three matching extensions 116 for each such container on the opposite continuous chain.

Interconnecting the continuous chains 110 in spaced, substantially parallel relation are a multiplicity of transversely disposed flight bars 120. The flight bars have first and second ends 121 and 122 which are screwthreadably affixed on the individual continuous chains 110. As shown in FIG. 3, the flight bars are mounted in spaced relation along the continuous chains so that adjoining flight bars define a container transporting position 123. As can be seen in FIG. 3, a flight bar 120 trails each set of extensions 116 so that there are, in other words, within each container transporting position 123 ahead of each flight bar 120 three of the extensions 116 on each continuous chain and the corresponding extensions of each set of three are disposed on the chains extending toward each other in matching juxtaposition.

The apparatus 10 includes a plurality of container transporting members or arms 130 which depend from and are pivotally mounted on certain of the extensions 116 of the continuous chains 110. Each arm 130 has a proximal end 131, which is pivotally affixed on its extension, and a distal end 132. Mounted substantially centrally along the length of each arm and extending further inwardly of the channel 32 is a horizontally mounted article support or engagement post 133. Mounted on the distal end of each arm and extending further inwardly of the channel is an axle 134 which mounts a relatively small caster or wheel 135. As should be understood by a study of FIG. 5, a pair of the arms is mounted on the individual chains 110 for each container transporting position 123 with one extension 116 approximately midway between the arms of each pair. The corresponding arms of the continuous chains for eahc container transporting position are aligned transversely of the apparatus and are otherwise adapted to support a container 17 which is in contact with the flight bar 120 in the container transporting position.

In the apparatus 10, mounted substantially centrally of the housing 12 and extending along the channel 32 in a substantially horizontal attitude is a pair of platforms or tracks generally indicated by the numeral 140. Each platform 140 is mounted in a fixed substantially horizontal position by a plurality of platform frame members 142 only two of which are shown in FIG. 5, and which are affixed by welding or the like on a plurality of transversely disposed support beams 143 which are affixed on and extend between the left and right side walls 24 and 25, respectively. Each frame member 142 mounts a horizontally disposed rail 144 upon which the caster 135 of an individual arm 130 may ride. Each platform has an intake end 145, a discharge end 146, an inside edge 150, and an outside edge 151. The platform defines a first path of travel 152 for the plurality of arms 130. Formed in each of the platforms in a position which is closely adjacent to the intake end thereof is an aperture 153. Hingedly mounted on each rail within each aperture is a door 154 which is movable between a closed or first position 155 shown in full lines in FIG. 3 and an opened or second position 156 shown in full lines in FIG. 4. The doors are adapted to divert the arms 130 into second paths of travel 157 whereby the casters 135 do not ride in contact with the rails 144. A yoke assembly 158 interconnects and extends between the doors of the respective rails in such a manner that they pivot in unison between the closed and opened positions.

The apparatus 10 has a control mechanism, generally indicated by the numeral 170 mounted internally of the housing 12 and substantially centrally of the channel 32 for actuating the doors 154 which direct the arms 130 along the first or second path of travel 152 and 157, respectively. The control mechanism is mounted in a suitable position in the channel, below the platforms 140 by a control frame 171. The control frame has a vertically disposed beam 172 which is mounted by suitable fasteners or welding on the second transversely disposed beam 44. The vertical beam 172 has affixed thereto a mounting plate 173 which provides a suitable pivotal point of attachment for a pneumatic cylinder 174. The pneumatic cylinder is of conventional design having a cylinder portion 175, which slidably mounts a rod portion 176 which is pivotally interconnected to the yoke 158 interconnecting the doors 154.

Figure 7:
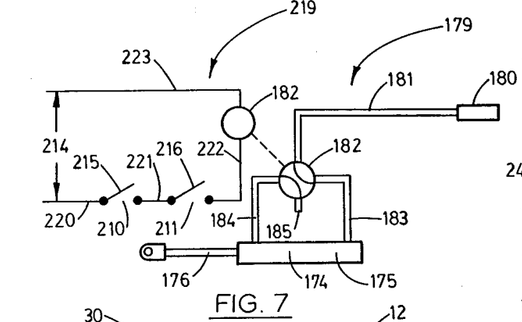
FIG. 7 is a schematic diagram of the electrical and pneumatic systems of the apparatus for discriminately treating containers and the like of the present invention.

The pneumatic cylinder 174 is operated by a pneumatic system 179 shown in FIG. 7. The pneumatic cylinder is connected in fluid-transferring relation to a source of air pressure 180 by a pneumatic conduit 181. The pneumatic conduit 181 is connected to an electrically actuated valve 182. A pneumatic conduit 183 interconnects the valve 182 and one end of the cylinder portion. A pneumatic conduit 184 interconnects the opposite end of the cylinder portion and the electrically actuated valve. A pneumatic conduit 185 is connected to the valve 182 and permits air pressure to be exhausted to atmosphere under control of the valve.

Figure 6:
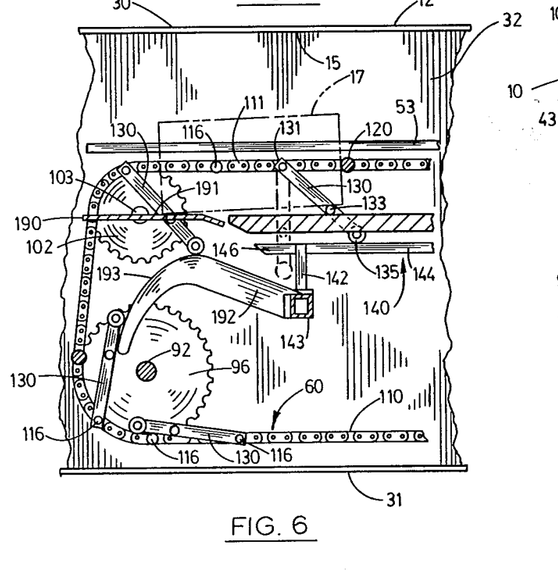
FIG. 6 is a somewhat further enlarged, fragmentary, longitudinal, vertical section taken on line 6—6 in FIG. 2.

In close proximity to the discharge ends 146 of the platforms 140 is a receiving station 190. The receiving station is defined by a horizontally disposed plate 191 which is mounted on the housing 12 in an attitude substantially centrally of the channel 32, and between the pair of continuous chains 110. Affixed in a predetermined position by welding or the like on the support beam 143 which is mounted most closely adjacent to the discharge ends 146 of the platforms 140, is a pair of arm deflectors 192. The arm deflectors each have a camming surface 193 which urges the plurality of pivotally mounted arms 130 into rested mating engagement against the flight bars 120. This may best be visualized upon reference to FIG. 6. The camming surfaces are disposed for engagement by the casters 135 of the transporting arms to pivot the distal ends 132 of the transporting arms in sequence in the opposite direction to the direction of movement of their respective continuous chains. Such pivoting is continued until continued movement of the continuous chains causes the transporting arms to flop backwardly and to be retained in the resulting inverted positions by gravity during the entire lower runs of the chains, as shown in FIG. 3.

Mounted substantially centrally of the housing 12 and between the inside edges 150 of the horizontally disposed rails 144 of the platforms 140, the apparatus 10 has a vibrating bed 200 which is adapted to impart oscillatory motion to volume filled containers 11 which have been diverted into the second path of travel 157 by the action of the doors 154. The vibrating bed, in and of itself, is of conventional design and therefore, for the sake of brevity, is not discussed in significant detail herein. The vibrating bed has top and bottom surfaces 201 and 202 and a vibrator housing 203 which is mounted substantially centrally of the bottom surface. A pulley 204 is rotatably mounted on the vibrator housing. An electric motor 205, which is suitably interconnected with a source of electricity not shown, is mounted on a pair of the support beams 143 which are closely adjacent to the vibrator housing. A V-belt 206 interconnects the vibrator housing and the electric motor; the electric motor imparting energy to the vibrator housing to cause the creation of the oscillatory action of the vibrating bed.

Affixed on the container guide 53 which is mounted on the internal surface 15 of the right side wall 25 in an attitude closely adjacent to the intake station 42, the apparatus 10 has a first photoelectric sensor, cell or discriminator 210. The first photoelectric sensor is electrically interconnected with a second photoelectric sensor, cell or discriminator 211 which is mounted externally of the housing 12 in an attitude above and in substantial registry with the channel 32. The second photoelectric sensor is held in a fixed attitude externally of the housing by an adjustable support frame 212. As best illustrated in FIG. 3, the second photoelectric sensor emits a beam of light which is graphically illustrated by the arrows 213.

The first and second photoelectric sensors 210 and 211 respectively are electrically interconnected with a source of electrical energy 214. The first and second photoelectric sensors also have switch members 215 and 216 respectively. The apparatus 10 has an electrical circuit 219, shown in FIG. 7, having a first electrical conductor 220 which interconnects the source of electrical energy with the first photoelectric sensor. A second electrical conductor 221 interconnects the first photoelectric sensor and the second photoelectric sensor. A third electrical conductor 222 interconnects the second photoelectric sensor and the electrically actuated valve 182 and a fourth electrical conductor 223 interconnects the electrically actuated valve and the source of electrical energy thus completing the circuit.

For purposes purely of understanding one environment within which the apparatus 10 operates, it will be understood that the machine 11 has a tucking station 230 which is mounted externally of the housing 12 on the top wall 30 and is adapted to fold the various panels or flaps, not shown, of the container 17 into predetermined positions. Moreover, a gluing station 231 is affixed on the top wall, and is adapted to apply adhesive to certain of the flaps of each container passing along the channel 32. It will also be understood that the machine 11 has suitable means, not shown, for folding the flaps to which adhesive has been applied into engagement with the container in a predefined relationship. A powered discharge bed 232 receives the containers which are moved out of engagement with the receiving station 190 by the action of the flight bars 120. The powered discharge bed has a plurality of powered rollers 233 which transport the containers to the discharge end 23 of the housing 12. The powered discharge bed further has a plurality of vertically disposed compression rollers 234 which are adapted to apply pressure to the flaps of the containers while the adhesive which has been applied in the gluing station sets.

OPERATION

The operation of the described embodiment of the present invention is believed to be readily apparent and is therefore briefly summarized at this point.

The apparatus 10 for discriminately treating containers and the like is adapted to discriminate between containers having different contents and to divert containers which are of the volume filled type into a path of travel, thus causing the containers to be carried into oscillating engagement with the vibrating bed 200. A stream of randomly ordered containers containing both volume filled or tray packed containers enters into the intake end 22 of the housing 12 by the action of the powered intake bed 33. The powered intake bed propels the random stream of containers, one at a time, into receiving engagement with the intake station 42. Upon being received into this position, each container "trips" the first photoelectric sensor 210. The first photoelectric sensor upon detecting the presence of a container, closes the switch member 215 which thereafter permits electricity from the source of electrical energy 214 to pass to the second photoelectric sensor 211. Upon receiving this electricity, the second photoelectric sensor emits a beam of light 213 downwardly into the container 17 in the intake station.

It is the practice with volume filled containers, but not with tray packed containers, to place a sheet of white paper, or the like, in overlaying relation to the fruit to help protect the fruit and exclude dust and other deleterious substances. Accordingly, in the case of volume filled containers, but not with tray packed containers, the light is reflected back to the second photoelectric sensor in sufficient intensity to cause the second photoelectric sensor to close the switch member 216. This, in turn, causes the valve 182 to be activated to release pressure contained in the pneumatic cylinder 174 through pneumatic conduits 183 and 184. If light of sufficient intensity is not reflected back to the second photoelectric sensor, the valve 182 is not activated and the pneumatic cylinder thus retains the doors 154 in the closed position shown in FIG. 3.

When the pressure is released, the rod portion 176 retracts, thus moving the doors 154 from the first position 155, to the second position 156. In the second position, the transporting arms 130, on which that volume filled container would have been supported had the second photoelectric sensor detected a tray packed container, pivot downwardly as the casters 135 thereof pass through the doors 154 and beneath the rails 144, as can best be visualized in FIG. 4. This causes the engagement posts 133 to drop below the level of the top surface 201 of the vibrating bed 200. Thus, instead of being deposited on the engagement posts of the supporting arms, the volume filled container is pushed by its flight bar off the supporting surface 51 and onto the top surface 201 of the vibrating bed, as can best be visualized in FIG. 4. The bed thereafter imparts oscillatory motion to the volume filled contents to cause them to settle for the purposes previously described. The flight bar 120 thereafter urges the volume filled container along the length of the vibrating bed and into engagement with the receiving station 190 and onto the powered discharge bed 232. This relationship is best understood by a study of FIGS. 4 and 6.

In the case of handling a tray packed container 17 wherein the contents do not require the administration of vibratory motion, the second photoelectric sensor does not close the switch member 216 and the pneumatic cylinder 174 remains pressurized from the source 180 to retain the doors 154 in the closed positions 155. In the closed positions, the doors 154 direct the supporting arms 130 along the first path of travel 152 wherein the supporting arms ride in contact with the rails 144. Accordingly, the engagement posts 133 of the supporting arms receive the tray packed container in supporting relation from the supporting surface 51 of the intake platform 50, as best shown in FIG. 3. The container is thus carried in a spaced substantially parallel attitude above the top surface 201 of the vibrating bed 200 and thus is not vibrated.

After a volume filled container has passed from beneath the second photoelectric sensor, that sensor no longer registers the light reflected from the white paper. Accordingly, switch 216 opens. After a time delay built into the valves operation to assure that the casters 135 of the arms for that volume filled container have passed through the apertures 153, the valve 182 returns the pneumatic cylinder 174 to its normal expanded condition. This is accomplished by exhausting pressure from the pneumatic system through pneumatic conduits 184 and 185 and pressurizing the pneumatic cylinder on the opposite side of the piston thereof through pneumatic conduit 183. The rod 176 is thus extended to return the doors 154 to the normal closed positions 155.

Therefore, the apparatus for discriminately treating containers and the like of the present invention is particularly well suited for use in discriminating between volume filled and tray packed containers; dependably diverts or urges selected containers into a first or second path of travel for appropriate treatment; and in the second path of travel the apparatus transports selected containers into oscillating engagement with a vibrating bed for the purpose of causing the settling of the contents.

Although the invention has been herein shown and described in what is conceived to be the most practical and preferred embodiment, it is recognized that departures may be made therefrom within the scope of the invention which is not to be limited to the illustrated details disclosed.

Having described my invention, what I claim as new and desire to secure by Letters Patent is:

1. In a machine for handling containers and the like of different characteristics and having a continuous conveyor for conveying said containers along a path of travel through at least one work station, an apparatus for discriminately treating the containers comprising a plurality of individual arms borne by said conveyor and individually depending therefrom in predetermined operational attitudes, each arm mounting a support, the arms movable between first attitudes wherein said containers are not borne by said supports during movement along the path of travel and second attitudes wherein said containers are borne by said supports during movement along the path of travel; control means mounted on the machine for individually selectively placing said arms in the first and second attitudes; and means borne by the machine for individually detecting the characteristics of the containers and operating said control means to place the arms for each container detected in the first or second attitudes appropriate for the characteristics of said container.

2. Apparatus for discriminately treating containers and the like having different contents comprising
a housing having a conveyor means for transporting the containers along a predetermined first and second path of travel, the first path of travel substantially overlaying the second path of travel;
means mounted on the housing for selectively discriminating between the containers based upon their contents and giving a signal responsive to selected contents;
means mounted on the housing for imparting vibratory motion to the containers having selected contents along the second path of travel; and
means mounted on the housing for selectively diverting the containers into the first and second paths of travel in response to the signal received from the discriminating means.

3. The apparatus of claim 2 wherein the means for selectively discriminating between the containers is a photoelectric cell and said containers have contents that require the administration of vibratory motion have portions which actuate the photoelectric cell.

4. The apparatus of claim 2 wherein the first path of travel is defined by a platform which is mounted internally of the housing, said platform having a surface upon which the casters of the arms rest for guiding the arms along the first path of travel and the containers having contents not requiring the administration of vibratory motion moving in the first path of travel in an attitude in spaced relation to the top surface of the platform; and said diverting means is a door which is mounted on the platform and operable, upon said discriminating means detecting containers having said selected contents, to move downwardly whereby the casters do not ride in contact with the platform thereby to divert the arms into the second path of travel and directing said the container into slidable rested relation on the surface of the platform.

5. The apparatus of claim 4 wherein the means for imparting vibratory motion is a vibrating bed which is mounted substantially centrally of the housing and the vibrating bed has a top surface which is disposed in an attitude substantially parallel to the top surface of the platform which defines the first path of travel.

6. Apparatus for discriminately treating containers and the like having different contents and wherein the containers are volume filled and tray packed containers, the apparatus comprising
a housing mounting a platform which defines a first path of travel, said housing further mounting a continuous conveyor which mounts in predetermined locations along its length a plurality of arms for supporting tray packed containers in said first path of travel, each arm further mounting a caster operable to rest in rolling relation on the platform to support its respective arm;
a vibrating bed disposed substantially centrally of the housing for imparting vibratory motion selectively to the volume filled containers along a second path of travel wherein the volume filled containers are not supported on the arms;
a photoelectric cell mounted on the housing for selectively discriminating between a volume filled and tray packed container, the photoelectric cell emitting an electronic signal in response to the presence of a volume filled container on the conveyor; and
a control mechanism mounted on the housing which is selectively movable in response to the signal emitted from the photoelectric cell between a first position whereby the arms are diverted into a path of travel when they are transporting a tray packed container along said first path of travel, the arms supporting the tray packed container in spaced relation to the platform, and a second position whereby the arms are diverted into another path of travel and out of rolling engagement with the platform to allow the volume filled container to travel along said second path of travel and into oscillatory engagement with the vibrating bed.

7. The apparatus of claim 6 wherein the first path of travel substantially overlays the second path of travel in substantially parallel relation internally of the housing and the arms individually mount substantially horizontally disposed article engagement posts to hold the containers in supported relation on the continuous chain conveyor.

8. The apparatus of claim 7 wherein the platform that defines the first path of travel has an aperture formed therein and the control mechanism includes a door, hingedly mounted in the aperture to direct the arms into either one of their paths of travel, and a pneumatic cylinder connected to the door and operable to move the door between the first position and the second position.

9. In a machine for handling volume filled and tray packed containers and having a continuous conveyor for conveying the volume filled and tray packed containers along a path of travel and through at least one work station and wherein a vibrating bed is mounted in the work station, the apparatus comprising:

a platform borne by the machine and defining a path of travel for the volume filled and tray packed containers;

a plurality of arms, each mounting an engagement post and each mounted on the conveyor and movable between a first attitude depending in substantially normal relation from the conveyor, wherein said volume filled containers are supported on the vibrating bed and not on the engagement posts during movement along the path of travel, and a second attitude resting on the platform and depending in angulated relation with respect to the conveyor, wherein said tray packed containers are supported on said engagement posts during movement along the path of travel and not on the vibrating bed;

control means mounted on the machine for individually, selectively placing said arms in the first and second attitudes; and means for individually detecting volume filled containers and operating said control means to place the arms in the first attitudes for each of said volume filled containers whereby the conveyor transports each of said volume filled containers along the platform and into oscillatory engagement with the vibrating bed.

* * * * *

UNITED STATES PATENT AND TRADEMARK OFFICE
CERTIFICATE OF CORRECTION

PATENT NO. : 4,744,195

DATED : May 17, 1988

INVENTOR(S) : Gerald W. Reed

It is certified that error appears in the above-identified patent and that said Letters Patent are hereby corrected as shown below:

Column 7, line 18, delete "eahc" and substitute ---each---.

Column 11, line 28, after the semicolon and before "control" insert ---means on said conveyor for moving said containers when said arms are in their first attitudes;---.

Column 11, line 41, after "travel" and before the semicolon insert ---, wherein the conveyor means is a continuous conveyor which mounts in depending relation a plurality of arms that have proximal ends which are pivotally mounted on the conveyor, engagement posts which are disposed at substantially normal attitudes relative to their respective arms and are operable to engage a container in supporting relation during movement of that container along the first path of travel, and distal ends which mount casters of predetermined dimensions, the casters operable individually to position the arms in the first or second paths of travel---.

UNITED STATES PATENT AND TRADEMARK OFFICE
CERTIFICATE OF CORRECTION

PATENT NO. : 4,744,195

DATED : May 17, 1988

INVENTOR(S) : Gerald W. Reed

It is certified that error appears in the above-identified patent and that said Letters Patent is hereby corrected as shown below:

Column 12, between lines 28 and 29, insert the following new paragraph ---means on said conveyor for moving said containers when said arms are in their first attitudes;---.

Signed and Sealed this

Twentieth Day of September, 1988

Attest:

DONALD J. QUIGG

Attesting Officer

Commissioner of Patents and Trademarks